(12) United States Patent
Sotomura (10) Patent No.: US 6,916,576 B2
(45) Date of Patent: Jul. 12, 2005

(54) POWER GENERATING METHOD AND CELL (75) Inventor: Tadashi Sotomura, Kashiwara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 413 days.

(21) Appl. No.: 10/130,829

(22) PCT Filed: Sep. 14, 2001

(86) PCT No.: PCT/JP01/08029
§ 371 (c)(1),
(2), (4) Date: May 23, 2002

(87) PCT Pub. No.: WO02/33775
PCT Pub. Date: Apr. 25, 2002

(65) Prior Publication Data
US 2003/0082437 A1 May 1, 2003

(30) Foreign Application Priority Data

Oct. 17, 2000 (JP) .......................................... 2000-316459
May 25, 2001 (JP) .......................................... 2001-156641

(51) Int. Cl.$^7$ ................................................. H01M 4/36
(52) U.S. Cl. ............................. 429/105; 429/40; 429/43
(58) Field of Search ............................. 429/40, 43, 105

(56) References Cited

U.S. PATENT DOCUMENTS 3,477,879 A * 11/1969 Sisler ............................. 429/2
4,037,029 A *  7/1977 Anderson ..................... 429/111
4,578,323 A *  3/1986 Hertl et al. ..................... 429/15
5,399,637 A *  3/1995 Willett et al. ................ 526/142

FOREIGN PATENT DOCUMENTS

EP 1 119 067 A2 7/2001
GB 1077611 8/1967
JP 2001-202972 7/2001
JP 2001-203007 7/2001

OTHER PUBLICATIONS

Ameta et al., "Studies in the use of toluidine blue–glucose system in a photogalvanic cell.", The Arabian Journal for Science and Engineering, vol. 15, No. 41, Oct. 1990, pp. 591–595.*

Gangotri et al., "Use of micelles in photogalvanic cells . . . ", Journal of Photochemistry and Photobiology A: Chemistry 123 (1999 93–97.*

K.M. Gangotri, et al, *"Use of Tergitol–7 in Photogalvanic Cell for Solar Engery Conversion and Storage: Toluidine Blue–Glucose System"* International Journal of Energy Research, vol. 20, 1996, pp. 581–585.

S. Ameta, et al *"Studies in the Use of Toluidine Blue–Glucose System in a Photogalvanic Cell"* The Arabian Journal for Science and Engineering, vol. 15, No. 4A, Oct. 1990, pp. 591–595.

(Continued)

Primary Examiner—Carol Chaney
(74) Attorney, Agent, or Firm—McDermott Will & Emery LLP (57) ABSTRACT A positive electrode, a negative electrode, and an electrolyte intervening between the positive electrode and the negative electrode are employed, and a molecule capable of being excited due to absorption of light and electrochemically oxidizing carbohydrate is provided at at least either the negative electrode or the electrolyte, with production of electromotive force occurring between the positive electrode and the negative electrode as a result of supply of carbohydrate while the molecule is irradiated with light and oxidization of carbohydrate by the molecule at the negative electrode. This method makes it possible for the chemical energy which carbohydrates possess to be directly utilized as electrical energy.

24 Claims, 2 Drawing Sheets

OTHER PUBLICATIONS

B. Alberts, et al, *"How Cells Obtain Engery from Food"* Essential Cell Biology An Introduction to the Molecular Biology of the Cell, Chapter 4, pp. 107–111.

Nazeeruddin, et al *"Efficient Panchromatic Sensitization of Nanocrystalline TiO2 Films by a Black Dye Based on a Trithiocyanato–Ruthenium Complex"* Chem. Commun, 1997, pp. 1705–1706.

H. Sugihara, et al, *Efficient Photosensitaization of Nanocrystalline TiO2 Films by a New Class of Sensitizer: cis–Dithiocyanato bis(4,7–Dicarboxy–1,10–Phenanthroline)Ruthenium(II)*, The Chemical Society of Japan, Chemistry Letters, 1998, pp. 1005–1006.

A. Islam, *"New Platinum (II) Polypyridyl Photosensitizers for TiO2 Solar Cells"* New J. Chem., 2000, 24, pp. 343–345.

The Journal of Organic Chemistry, American Chemical Society Publications, 5A.

D. Gust, et al, *"Efficient Multistep Photoinitiated Electron Transfer in a Molecular Pentad"* vol. 248, Apr. 13, 1990, pp. 199–201.

A. Hagfeldt, et al. *"Light–Induced Redox Reactions in Nanocrystalline Systems"* American Chemical Society, Chemical Rev., 1995, pp. 49–68.

* cited by examiner

FIG. 2

POWER GENERATING METHOD AND CELL

TECHNICAL FIELD

The present invention pertains to a battery and method for generating electricity employing an electrochemical oxidation reaction of a polysaccharide, disaccharide, monosaccharide, or other such carbohydrate.

BACKGROUND ART

Carbohydrates are synthesized by plants through photosynthesis. Animals ingest carbohydrates for use as a source of energy. Besides monosaccharides, oligosaccharides, polysaccharides, and other such saccharides, carbohydrates also include saccharide analogs such as cyclic polyhydric alcohols, amino sugars, and the like.

Glucose, which is representative of carbohydrates, is expressed by the chemical formula $C_6H_{12}O_6$. Complete oxidation of glucose results in liberation of 24 electrons per molecule of glucose, with production of carbon dioxide gas and water. These 24 electrons are utilized as a source of energy within the animal body.

Thermodynamic calculations indicate that glucose possesses 2872 kJ of energy per 1 mole, or 4.43 W·hr per 1 gm. This is as much or greater than the weight energy density of 3.8 W·hr/gm of the metallic lithium employed at the negative electrode of the lithium battery which is well known as a high energy density battery.

There are only two methods which have been discovered to date for utilization of the energy possessed by carbohydrates. One is utilization of the thermal energy produced by direct combustion of carbohydrate in air, and the other is utilization in the form of the chemical energy produced by action of any of some 12 or more types of oxidase present within the body of an animal which has consumed carbohydrate (Albert et. al., Essential Cell Biology (Garland Publishing, Inc.), 107 (1997)).

This is to say that a method that would allow the chemical energy which carbohydrates possess to be effectively utilized directly as electrical energy has yet to be discovered.

DISCLOSURE OF INVENTION

The present invention was conceived in light of the foregoing, its object being to provide a battery and a method for generating electricity allowing the chemical energy which carbohydrates possess to be utilized directly as electrical energy.

The present invention pertains to a method for generating electricity employing a positive electrode, a negative electrode, and an electrolyte intervening between the positive electrode and the negative electrode, wherein a molecule capable of being excited due to absorption of light and electrochemically oxidizing carbohydrate is provided at at least either the negative electrode or the electrolyte, with production of electromotive force occurring between the positive electrode and the negative electrode as a result of supply of carbohydrate while the molecule is irradiated with light and oxidization of carbohydrate by the molecule at the negative electrode.

It is preferred that a metal element capable of forming a complex comprising a carbohydrate hydroxyl group serving as ligand be provided at at least either the negative electrode or the electrolyte. This is because a carbohydrate forming the complex can be oxidized by the molecule with good efficiency.

It is preferred that the molecule be excited as a result of absorption of light having wavelength within the range of from 300 nm to 1000 nm.

It is preferred that the negative electrode have an oxide semiconductor that accepts an electron from the molecule.

It is preferred that reduction of oxygen take place at the positive electrode.

Cu, Ag, Pt, Fe, Ni, Zn, In, Sn, Pb, Sb, Ti, Mg, or the like may be employed as the metal element. Of these, it is preferred that the metal element be at least one species selected from among the group consisting of Cu, Ag, and Pt. Furthermore, an alloy comprising at least one of the metal element species may be employed.

The present invention moreover pertains to a battery comprising a positive electrode, a negative electrode, and an electrolyte intervening between the positive electrode and the negative electrode, wherein at least either the negative electrode or the electrolyte has a molecule capable of being excited due to absorption of light and electrochemically oxidizing carbohydrate.

It is preferred in the battery that at least either the negative electrode or the electrolyte have a metal element capable of forming a complex comprising a carbohydrate hydroxyl group serving as ligand.

A reduction reaction will proceed at the positive electrode at an electric potential higher than the electric potential at which the reaction for oxidation of carbohydrate proceeds at the negative electrode. It is preferred that the positive electrode be, for example, an oxygen electrode which reduces oxygen.

BEST MODE FOR CARRYING OUT THE INVENTION

The present invention is based on the discovery that action of a molecule made active due to excitation by light permits direct and efficient extraction of energy from carbohydrates, which store large quantities of energy. The present invention makes it possible for the chemical energy stored in carbohydrates to be directly utilized as electrical energy.

Specifically, an oxidation reaction occurring at a negative electrode as indicated by FORMULA (1), below, permits n electrons which a carbohydrate possesses to be directly extracted and supplied to an external electric circuit.

FORMULA (1)

$$nS + \text{energy in the form of light} \longrightarrow nS^* + ne$$
$$S^* + G \longrightarrow S + G_1$$
$$S^* + G_1 \longrightarrow S + G_2$$
$$S^* + G_{n-1} \longrightarrow S + G_n$$

Here, S represents a molecule prior to excitation, S* represents the molecule after it has been excited due to absorption of light, G represents a carbohydrate, e represents electron(s) delivered to the external circuit, and $G_n$ represents a chemical species produced when the carbohydrate gives up n electrons.

Figure 1:
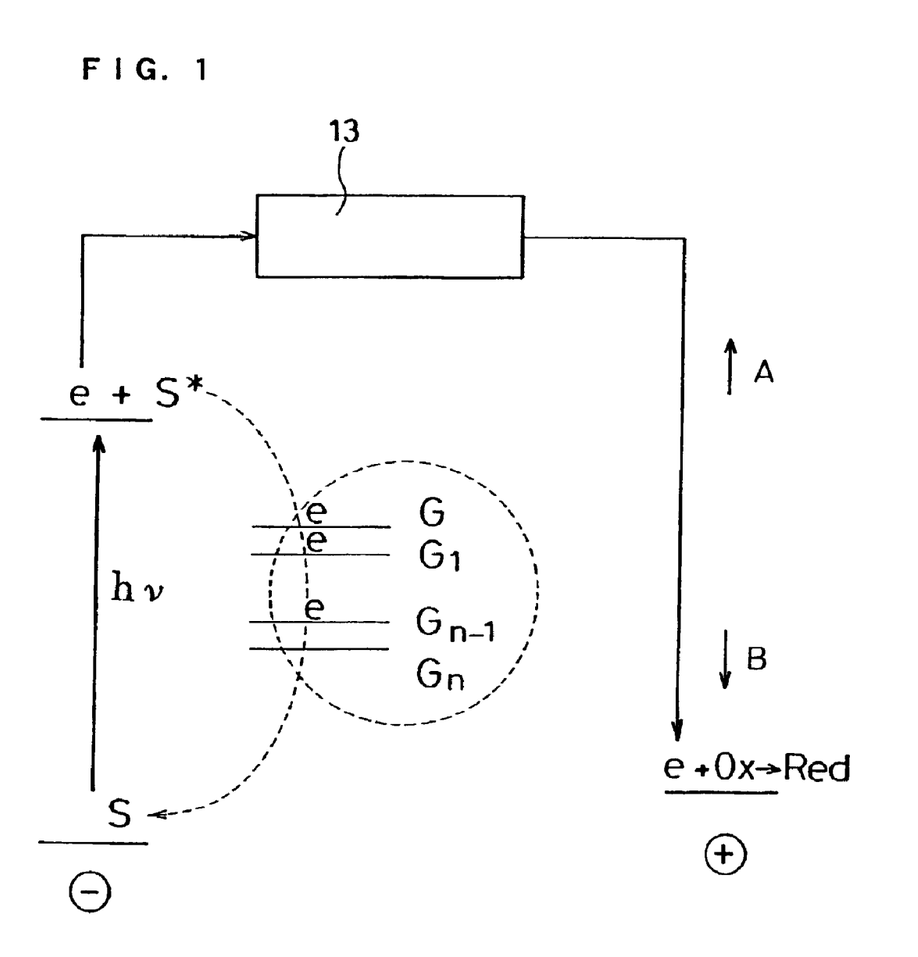
FIG. 1 is a schematic drawing showing a process by which carbohydrate is electrochemically oxidized by a molecule that has been excited by light.

FIG. 1 shows electron energy level (electric potential) and flow of electrons from negative electrode to positive electrode. Arrow A indicates the direction of decreasing electric potential, and arrow B indicates the direction of increasing electric potential.

As shown at FIG. 1, a molecule S is excited due to absorption of light, generating active S* and an electron e. The energy (hυ) of a photon absorbed by the molecule S is characteristic of the molecule S, and corresponds to the difference in energy between S and S*. The electron which is generated has a lower electric potential as determined by the difference in energies, and after performing work at an external electric circuit 13, the electron arrives at the positive electrode, where it is used in a reduction reaction which occurs at that positive electrode. Such mechanism allows production of an electromotive force between the positive electrode and the negative electrode.

It is preferred that the molecule S be excited as a result of absorption of light having wavelength within the range of from 300 nm to 1000 nm. The molecule S may have a single absorption peak within the wavelength domain or may have a plurality of absorption peaks therein. A metal complex colorant, an organic colorant, or the like may be employed as such molecule.

Among the metal complex colorants, a platinum complex colorant or a ruthenium complex colorant having Ru or Pt as central atom and having a biquinoline group, a bipyridyl group, a phenanthroline group, a thiocyanate group or a derivative of any of these groups as ligand may be employed.

As the organic colorant, a 9-phenylxanthenic colorant, a merocyaninic colorant, a polymethinic colorant, or the like may be employed.

It is also possible to employ a porphyrinic colorant combining features of both an organic colorant and a metal complex colorant in a structure having one or a plurality of porphyrin rings and having Cu, Zn, Mg, Fe, or other such metal as central atom. It is also possible to employ a colorant comprising only the porphyrin ring without presence of the metal central atom.

The molecule S which is excited by absorption of light may be provided at the negative electrode or may be dissolved or dispersed in the electrolyte. In the event that the molecule S is dissolved or dispersed in electrolyte, it will be capable of migration to the negative electrode. Accordingly, it will be possible in either case to cause the carbohydrate oxidation reaction to proceed with good efficiency at the negative electrode.

It is preferred that an electrically conductive thin film comprising an oxide semiconductor be formed at the negative electrode, and that the molecule which is excited due to absorption of light be disposed thereover. Furthermore, such semiconductor thin film efficiently will accept electrons from the molecule after it has been excited due to absorption of light and will efficiently supply electrons which have been so accepted to the external electric circuit. Accordingly, the oxidation reaction at the negative electrode will proceed smoothly. While it is preferred from the standpoint of light collection characteristics that the thin film transmit light, the thin film may be formed through molding of oxide semiconductor microgranules.

Titanium oxide, zinc oxide, tin oxide, indium tin oxide, and so forth may be employed for the oxide semiconductor. Any one of these may be used alone, or any two or more of these may be used in combination.

While G through $G_n$ and S* in the reaction formula (1) were written with the situation in mind of a reaction which proceeds with direct migration of electrons therebetween, migration of electrons between G through $G_n$ and S* may be made to occur such that one or more redox pairs intervene therebetween. Such a redox pair may be provided at the negative electrode or may be dissolved or dispersed in the electrolyte. But it will be possible in either case to cause the carbohydrate oxidation reaction to proceed with good efficiency at the negative electrode.

It is preferred that the redox pair have a redox potential that is lower than the electric potential of the molecule S when in the ground state. As such a redox pair, a quinone—hydroquinone pair, a NAD—NADH pair ("NAD" indicating the oxidized form of nicotinamide adenine dinucleotide, and "NADH" indicating the reduced form thereof), a NADP—NADPH pair ("NADH" indicating the oxidized form of nicotinamide adenine dinucleotide phosphate, and "NADPH" indicating the reduced form thereof), an iodine—iodate ion pair, or a ferredoxin, myoglobin, or other such metalloprotein having redox capability, or another such [redox pair] may be employed.

Carbohydrates and some metal elements form complexes wherein all or any portion of the carbohydrate hydroxyl groups serve as ligand(s). In such a complex, a temporary chemical bond is formed between a carbohydrate and a metal element by way of a hydroxyl group. In concert with formation of such temporary chemical bond, carbon—carbon bonds of the carbohydrate are weakened. As a result, oxidation of carbohydrate by the molecule S* in its excited state is facilitated. In other words, presence of this intervening complex permits increase in the efficiency of the carbohydrate oxidation reaction.

It is therefore preferred that a metal element capable of forming a complex comprising a carbohydrate hydroxyl group serving as ligand be provided in the neighborhood of the molecule S. The metal element may for example be provided in the electrolyte, in the electrically conductive thin film comprising oxide semiconductor, or on the negative electrode. In the event that the metal element is dissolved or dispersed in the electrolyte, it will be capable of migration to the negative electrode. Accordingly, it will be possible in either case to increase the efficiency of the carbohydrate oxidation reaction at the negative electrode. The complex may for example form at the negative electrode—electrolyte interface, in electrolyte, and so forth.

As used herein, "complex" refers to an intermediate substance formed at any point during the sequence of chemical reactions from reactant to product. Such intermediates include mononuclear complexes comprising a single central atom and one or more ligands, and polynuclear complexes comprising one or more central atoms and one or more ligands.

It is preferred that such metal element capable of forming a complex comprising a carbohydrate hydroxyl group serving as ligand be a metal element which forms an amphoteric hydroxide. Cu, Ag, Pt, Fe, Ni, Zn, In, Sn, Pb, Sb, Ti, and Mg may be cited as examples of such metal element. Any one of these may be used alone, or any two or more of these may be used in combination. Furthermore, an alloy comprising at least one of these may also be employed. Cu, Ag, and Pt in particular lend themselves to formation of complexes with carbohydrate by way of hydroxyl group.

While there is no particular limitation with regard to the carbohydrate, it is possible to employ glucose, mannose, galactose, fructose, glyceraldehyde, dihydroxyacetone, erythrose, ribulose, xylulose, sedoheptulose, ribose, deoxyribose, sorbose, glucosamine, galactosamine, and other such monosaccharides; isomaltose, maltose, cellobiose, lactose, raffinose, sucrose, and other such disaccharides; oligosaccharides; and starch, glycogen, cellulose, glycoprotein, glycosaminoglycan, glycolipid, and other such polysaccharides. Furthermore, foods, food residue, plant and animal remains, liquids extracted from plants and animals, and other such substances which contain carbohydrates may also be employed. Any one of these may be used alone, or any two or more of these may be used in combination.

The electrolyte used in the present invention serves to permit migration of anions and cations from positive electrode to negative electrode and/or from negative electrode to positive electrode, and to allow redox reactions to proceed in continuous fashion at the positive electrode and the negative electrode.

Both aqueous electrolytes and non-aqueous electrolytes may be applied to the present invention. Furthermore, liquid electrolytes, solid electrolytes, and gel electrolytes may all be applied to the present invention.

As the aqueous electrolyte, aqueous solutions containing dissolved metallic salts such as KCl, NaCl, $MgCl_2$, $ZnCl_2$, or $NH_4Cl$; alkalies such as $NH_4OH$, KOH, or NaOH; acids such as $H_3PO_4$ or $H_2SO_4$; or the like may for example be employed.

As the non-aqueous electrolyte, solvent mixtures of ethylene carbonate and propylene carbonate containing dissolved metallic salts such as $LiBF_4$ or $LiPF_6$ may for example be employed. Furthermore, solvents such as acetonitrile, methoxyacetonyl, or methoxypropionitrile containing dissolved quaternary ammonium salts such as pyridinium iodide, lithium salts such as lithium iodide, imidazolium salts such as imidazolinium iodide, amines such as t-butylpyridine, or the like may also be employed.

As the solid electrolyte, polyvinyl alcohol, polyvinylidene fluoride, polyacrylonitrile, polyethylene oxide, or polypropylene oxide retaining a salt such as $(C_4H_9)_4NBF_4$, $LiCl_4$, $LiBF_4$, or fluororesin having a pyridinium group, ammonium group, amide group, sulfonic group, or other such group, or another such substance may for example be employed.

The reduction reaction at the positive electrode will proceed at an electric potential higher than the electric potential of the electron(s) removed from carbohydrate by the molecule S at the negative electrode.

As examples of such reduction reactions, reduction reaction of water or oxygen; reduction reaction of hydroxides or oxides such as $LiNiO_2$, $LiMn_2O_4$, $LiCoO_2$, $Ag_2O$, $MnO_2$, $PbO$, $Pb(OH)_2$, $MnOOH$, or $NiOOH$; reduction reaction of sulfides such as $Ag_2S$, $FeS$, $MoS_2$, or $TiS_2$; reduction reaction of metal halides such as $CuCl_2$, $PbI_2$, or $AgI$; reduction reaction of quinones or organic sulfur compounds such as organic disulfide compounds; reduction reaction of electrically conductive polymers such as polythiophene or polyaniline; and the like may be cited.

Of these, it is preferred that the positive electrode be an oxygen electrode which reduces oxygen. If the positive electrode is an oxygen electrode, this will permit a gas containing oxygen such as air or the like to be used as a positive electrode active material. Accordingly, this will make it unnecessary for a positive electrode active material to be retained within the battery, permitting constitution of a battery having high energy density.

Such an oxygen electrode comprises a substance capable of reducing oxygen. As examples of such a substance, activated charcoal; manganese oxides such as $MnO_2$, $Mn_3O_4$, $Mn_2O_3$, or $Mn_5O_8$; platinum; palladium; iridium oxide; platinum ammine complexes; cobalt phenylenediamine complexes; metalloporphyrins possessing a central atom such as Co, Mn, Zn, or Mg; perovskite oxides such as $La(Ca)CoO_3$ or $La(Sr)MnO_3$; and the like may be cited.

Below, the present invention is described in concretive manners based on working examples.

WORKING EXAMPLE 1

Test electrodes were prepared using colorants D1 through D6, below, as a colorant molecule excited by absorption of light.

Ru Complex Colorant D1

D1 may be synthesized in accordance with a method described in a paper by M. K. Nazeeruddin et al. (J. Chem. Soc., Chem. Commun., p. 1075, (1997)).

Ru Complex Colorant D2

D2 may be synthesized in accordance with a method described in a paper by H. Sugihara et al. (Chem. Lett., p. 1005, (1998)).

Pt Complex Colorant D3

D3 may be synthesized in accordance with a method described in a paper by A. Islam et al. (New J. Chem., p. 343, (2000)).

Polymethine Colorant D4

D4 may be synthesized based on methods described at "Heterocyclic Compounds-Cyanine Dyes and Related Compounds" by F. M. Harmer (John Wiley and Sons, New York and London, published 1964), United Kingdom Patent No. 1,077,611, and elsewhere.

Phthalocyaninic Colorant D5

D5 may be synthesized in accordance with a method described in a paper by A. D. Adler et al. (J. Org. Chem., p. 476, (1967)).

Phthalocyaninic Colorant D6

-continued

D6 may be synthesized in accordance with a method described in a paper by D. Gust et al. (Science, p. 199, (1990)).

Colorants D1 through D6 each have either a single absorption peak or a plurality of absorption peaks in the wavelength domain of from 300 nm to 1000 nm.

Figure 2:
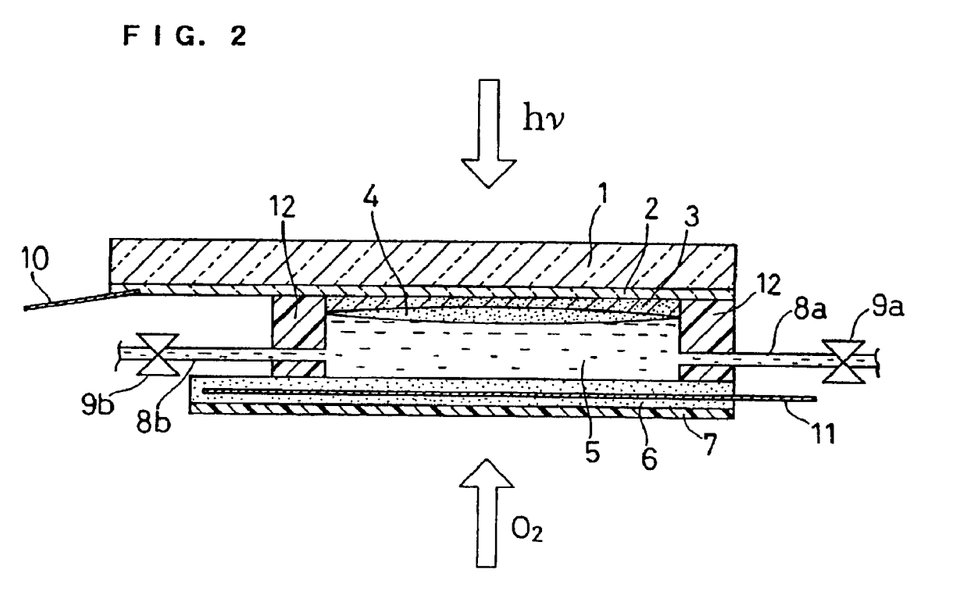
FIG. 2 is a longitudinal cross section of a power cell for evaluating the characteristics of a battery associated with the present invention.

Cells as shown in FIG. 2 were assembled using the foregoing test electrodes as negative electrodes.

(i) Test Electrode Preparation

An indium tin oxide (ITO) thin film of surface resistance 10 ohms/cm$^2$ was formed on a glass substrate of thickness 1 mm.

A dispersion was prepared by mixing 89 parts by weight of an acetonitrile solution containing 30 wt % of polyethylene glycol and 11 parts by weight of TiO2 granules of average grain diameter 10 nm.

The glass plate having the ITO thin film was immersed in the foregoing dispersion to apply the dispersion over the ITO thin film, and this was dried at 80° C. and fired for a further 1 hr in air at 400° C. As a result, a TiO$_2$ microgranule film of thickness approximately 10 μm was formed over the ITO thin film.

Two glass substrates having the ITO thin film and TiO$_2$ microgranule film were then arranged such that the respective TiO$_2$ microgranule films faced one another, and a partitioning frame member comprising sealant material was interposed between the TiO2 microgranule films. The assembly was thoroughly secured such that the partitioning frame member was sandwiched between the two substrates, constituting a cell.

An ethanol solution containing colorant D1 in a concentration 10 mM (M=moles/liter) was injected into the cell, filling the interior of the cell with the ethanol solution, and this was allowed to stand. One hour thereafter the ethanol solution was discharged from the cell and dry warm air was allowed to pass through the cell interior continuously for 1 hr, resulting in deposition of colorant D1 on the TiO$_2$ microgranule thin films. The interior of the cell was then filled with 4-tert-butylpyridine, and this was discharged therefrom. Next, the interior of the cell was washed with acetonitrile, and the cell interior was dried with warm air. The cell was thereafter disassembled to obtain test electrode (s) 1A having colorant D1 deposited on the TiO$_2$ microgranule thin film.

Test electrodes 2A through 6A were obtained in a similar fashion as test electrode 1A using colorants D2 through D6 in place of colorant D1.

(ii) Cell Assembly

Test electrodes 1A through 6A so obtained were respectively used as negative electrodes to assemble cells as shown at FIG. 2. An electrolyte 5 containing carbohydrate was introduced into the cells. Glucose or fructose was used as carbohydrate. A 0.1 M aqueous solution of KOH was used as the electrolyte. Concentration of glucose or fructose in the electrolyte was 50 mM.

An electrolyte containing glucose or fructose but not containing a redox pair was prepared, and an electrolyte containing glucose or fructose and also containing a redox pair in a concentration 5 mM was prepared. Hydroquinone (HQ) or NADH was used as the redox pair.

At FIG. 2, the numeral 1 denotes a glass substrate constituting a test electrode, an ITO thin film 2 being formed on one surface thereof. Furthermore, a TiO$_2$ microgranule thin film 3 is formed over the ITO thin film, and a colorant molecule layer 4 wherein a colorant molecule has been deposited is present at the surface of the TiO$_2$ microgranule thin film 3. A negative electrode lead 10 for connecting the cell to an external electric circuit is connected to the ITO thin film.

Arranged at a location facing the colorant molecule layer 4 of the test electrode is an oxygen electrode 6. The oxygen electrode, which serves as a positive electrode, comprises a mixture of powdered Mn$_2$O$_3$, powdered activated charcoal, powdered acetylene black, and polytetrafluoroethylene, and contains nickel mesh of thickness 0.2 mm as a core material. Provided on the exterior surface of the oxygen electrode 6 is an oxygen permeable membrane 7 comprising a water-repellent fluororesin. Furthermore, a positive electrode lead 11 for connecting the power cell to an external electric circuit is connected to the oxygen electrode 6.

A partitioning frame member 12 comprising transparent silicon rubber is interposed between the test electrode and the oxygen electrode, constituting a cell. The partitioning frame member is provided with an inlet 8a for introduction of the electrolyte and carbohydrate into the power cell interior, and an outlet 8b for discharge of the electrolyte and surplus carbohydrate to the power cell exterior. Inlet 8a and outlet 8b are respectively equipped with liquid valves 9a and 9b, permitting control of electrolyte and carbohydrate flow rates.

(iii) Cell Characteristics

After filling the interior of the cell with the electrolyte containing carbohydrate, light from a sunlight simulator (AM 1.5, 100 mW/cm$^2$) was irradiated from the glass substrate side and the electromotive force (OCV) at the cell was measured. Furthermore, voltage at the cell was measured at a time when the cell had been discharged for 20 min at a constant current of 100 μA. Results are shown at TABLE 1.

TABLE 1

| Test Electrode | Colorant | Carbohydrate | Redox Pair | OCV (V) Irradiation with light Yes | OCV (V) Irradiation with light No | Cell Voltage following Discharge (V) Irradiation with light Yes | Cell Voltage following Discharge (V) Irradiation with light No |
|---|---|---|---|---|---|---|---|
| 1A | D1 | Glucose | None | 1.1 | 0.2 | 0.8 | 0 |
|  |  |  | HQ | 0.7 | 0.65 | 0.65 | 0.2 |
|  |  |  | NADH | 1.2 | 1.05 | 1.0 | 0.3 |
|  |  | Fructose | None | 1.1 | 0.1 | 0.8 | 0 |
|  |  |  | HQ | 0.65 | 0.6 | 0.5 | 0.1 |
|  |  |  | NADH | 1.2 | 1.1 | 0.9 | 0.3 |
| 2A | D2 | Glucose | None | 1.1 | 0.2 | 0.7 | 0 |
|  |  |  | HQ | 0.65 | 0.6 | 0.55 | 0.1 |
|  |  |  | NADH | 1.15 | 1.1 | 0.9 | 0.1 |
|  |  | None | None | 1.0 | 0.1 | 0 | 0 |
|  |  |  | HQ | 0.7 | 0.65 | 0 | 0 |
|  |  |  | NADH | 1.2 | 1.1 | 0 | 0 |
| 3A | D3 | Glucose | None | 0.9 | 0.1 | 0.65 | 0 |
|  |  |  | HQ | 0.7 | 0.55 | 0.55 | 0.1 |
|  |  |  | NADH | 1.2 | 1.15 | 0.9 | 0.1 |
|  |  | Fructose | None | 1.0 | 0.2 | 0.7 | 0 |
|  |  |  | HQ | 0.65 | 0.5 | 0.5 | 0.1 |
|  |  |  | NADH | 1.15 | 1.1 | 0.85 | 0.2 |
| 4A | D4 | None | None | 0.9 | 0.05 | 0 | 0 |
|  |  |  | HQ | 0.65 | 0.55 | 0 | 0 |
|  |  |  | NADH | 1.2 | 1.05 | 0 | 0 |
|  |  | Fructose | None | 1.0 | 0.2 | 0.65 | 0 |
|  |  |  | HQ | 0.7 | 0.65 | 0.6 | 0.2 |
|  |  |  | NADH | 1.2 | 1.0 | 0.9 | 0.2 |
| 5A | D5 | Glucose | None | 1.1 | 0.25 | 0.65 | 0 |
|  |  |  | HQ | 0.7 | 0.65 | 0.6 | 0.1 |
|  |  |  | NADH | 1.2 | 1.1 | 0.85 | 0.3 |
|  |  | Fructose | None | 1.0 | 0.1 | 0.7 | 0 |
|  |  |  | HQ | 0.65 | 0.6 | 0.55 | 0.2 |
|  |  |  | NADH | 1.15 | 1.1 | 0.95 | 0.2 |
| 6A | D6 | Glucose | None | 0.7 | 0.2 | 0.55 | 0 |
|  |  |  | HQ | 0.65 | 0.6 | 0.55 | 0.2 |
|  |  |  | NADH | 1.2 | 1.15 | 1.0 | 0.3 |
|  |  | Fructose | None | 0.7 | 0.2 | 0.6 | 0 |
|  |  |  | HQ | 0.65 | 0.6 | 0.6 | 0.2 |
|  |  |  | NADH | 1.15 | 1.1 | 1.05 | 0.1 |

From the results at TABLE 1, it is clear that irradiation of light allows a high discharge voltage to be maintained for all test electrodes used in the power cells, and that these cells permit efficient generation of electricity.

Upon using liquid chromatography to analyze the electrolyte containing carbohydrate following testing, gluconic acid, oxalic acid, and formic acid-[these] being products of oxidation of glucose or fructose-were detected.

Next, the monosaccharides galactose, mannose, and sorbose; the disaccharides maltose, sucrose, lactose, and raffinose; and the polysaccharide starch were used in place of glucose and fructose, and test electrodes 1A through 6A were evaluated in the same fashion as described above. As a result, oxidation of carbohydrate was observed to occur as had been the case with glucose and fructose.

Upon carrying out similar evaluation with $TiO_2$—$WO_3$ microgranule film in place of the $TiO_2$ microgranule film, more or less similar cell characteristics were obtained. Here, the $TiO_2$—$WO_3$ microgranule film was formed using a dispersion comprising 92 parts by weight of an acetonitrile solution containing 30 wt % of polyethylene glycol and 8 parts by weight of a mixture of $TiO_2$ granules of average grain diameter 10 nm and $WO_3$ granules of average grain diameter 12 nm in a 5:1 ratio by weight. The glass plate having the ITO thin film was immersed in the foregoing dispersion, and this was dried at 80° C. and fired for 1 hr in air at 400° C., to form a $TiO_2$—$WO_3$ microgranule film of thickness approximately 8 μm over the ITO thin film.

WORKING EXAMPLE 2

Except for the fact that a $TiO_2$ microgranule film was not formed over the ITO thin film and colorants D1 through D6 were instead deposited directly on the ITO thin film, test electrodes 7A through 12A were prepared in the same fashion as at Working Example 1, constituting cells, the characteristics of which were evaluated. Results are shown at TABLE 2. Note however that cell discharge was at 10 μA for 200 min.

TABLE 2

| Test Electrode | Colorant | Carbohydrate | Redox Pair | OCV (V) Irradiation with light Yes | OCV (V) Irradiation with light No | Cell Voltage following Discharge (V) Irradiation with light Yes | Cell Voltage following Discharge (V) Irradiation with light No |
|---|---|---|---|---|---|---|---|
| 7A | D1 | Glucose | None | 1.25 | 0 | 0.95 | 0 |
|  |  |  | HQ | 0.7 | 0.65 | 0.65 | 0.2 |
|  |  |  | NADH | 1.2 | 1.05 | 1.0 | 0.3 |
|  |  | Fructose | None | 1.25 | 0 | 0.9 | 0 |
|  |  |  | HQ | 0.65 | 0.6 | 0.5 | 0.1 |
|  |  |  | NADH | 1.2 | 1.1 | 0.9 | 0.3 |
| 8A | D2 | Glucose | None | 1.2 | 0 | 0.8 | 0 |
|  |  |  | HQ | 0.65 | 0.6 | 0.55 | 0.1 |
|  |  |  | NADH | 1.15 | 1.1 | 0.9 | 0.1 |
|  |  | None | None | 1.15 | 0 | 0 | 0 |
|  |  |  | HQ | 0.7 | 0.65 | 0 | 0 |
|  |  |  | NADH | 1.2 | 1.1 | 0 | 0 |
| 9A | D3 | Glucose | None | 0.95 | 0 | 0.65 | 0 |
|  |  |  | HQ | 0.7 | 0.55 | 0.55 | 0.1 |
|  |  |  | NADH | 1.2 | 1.15 | 0.9 | 0.1 |
|  |  | Fructose | None | 1.05 | 0 | 0.75 | 0 |
|  |  |  | HQ | 0.65 | 0.5 | 0.5 | 0.1 |
|  |  |  | NADH | 1.15 | 1.1 | 0.85 | 0.2 |
| 10A | D4 | None | None | 1.0 | 0 | 0 | 0 |
|  |  |  | HQ | 0.65 | 0.55 | 0 | 0 |
|  |  |  | NADH | 1.2 | 1.05 | 0 | 0 |
|  |  | Fructose | None | 1.1 | 0 | 0.65 | 0 |
|  |  |  | HQ | 0.7 | 0.65 | 0.6 | 0.2 |
|  |  |  | NADH | 1.2 | 1.0 | 0.9 | 0.2 |
| 11A | D5 | Glucose | None | 1.25 | 0 | 0.7 | 0 |
|  |  |  | HQ | 0.7 | 0.65 | 0.6 | 0.1 |
|  |  |  | NADH | 1.2 | 1.1 | 0.85 | 0.3 |
|  |  | Fructose | None | 1.2 | 0 | 0.75 | 0 |
|  |  |  | HQ | 0.65 | 0.6 | 0.55 | 0.2 |
|  |  |  | NADH | 1.15 | 1.1 | 0.95 | 0.2 |
| 12A | D6 | Glucose | None | 0.7 | 0 | 0.65 | 0 |
|  |  |  | HQ | 0.65 | 0.6 | 0.55 | 0.2 |
|  |  |  | NADH | 1.2 | 1.15 | 1.0 | 0.3 |
|  |  | Fructose | None | 0.7 | 0 | 0.65 | 0 |
|  |  |  | HQ | 0.65 | 0.6 | 0.6 | 0.2 |
|  |  |  | NADH | 1.15 | 1.1 | 1.05 | 0.1 |

From the results at TABLE 2, it is clear that irradiation of light allows a high discharge voltage to be maintained for all test electrodes used in the cells, and that these cells permit efficient generation of electricity.

Upon using liquid chromatography to analyze the electrolyte containing carbohydrate following testing, gluconic acid, oxalic acid, and formic acid-these being products of oxidation of glucose or fructose-were detected.

Subsequently, the monosaccharides galactose, mannose, and sorbose; the disaccharides maltose, sucrose, lactose, and raffinose; and the polysaccharide starch were used in place of glucose and fructose, and test electrodes 7A through 12A were evaluated in the same fashion as described above. As a result, oxidation of carbohydrate was observed to occur as had been the case with glucose and fructose.

WORKING EXAMPLE 3

Except for the fact that an $SnO_2$ microgranule film was formed over the ITO thin film in place of the $TiO_2$ microgranule film, test electrodes 13A through 18A were prepared in the same fashion as at Working Example 1, constituting cells, the characteristics of which were evaluated. Cell discharge was at 100 μA for 20 min. Results are shown at TABLE 3.

Here, the $SnO_2$ microgranule film was formed by using the spin coating method to apply over the ITO thin film a dispersion comprising 95 parts by weight of an ethanol solution containing 15 wt % of polyvinyl alcohol and 5 parts by weight of $SnO_2$ granules of average grain diameter 15 nm, drying at 80° C., and firing in air at 380° C. for 1 hr. The $SnO_2$ microgranule film so obtained was approximately 15 μm in thickness.

TABLE 3

| Test Electrode | Colorant | Carbohydrate | Redox Pair | OCV (V) Irradiation with light Yes | OCV (V) Irradiation with light No | Cell Voltage following Discharge (V) Irradiation with light Yes | Cell Voltage following Discharge (V) Irradiation with light No |
|---|---|---|---|---|---|---|---|
| 13A | D1 | Glucose | None | 1.1 | 0.2 | 0.7 | 0 |
|  |  |  | HQ | 0.7 | 0.65 | 0.55 | 0.1 |
|  |  |  | NADH | 1.2 | 1.05 | 0.9 | 0.15 |
|  |  | Fructose | None | 1.1 | 0.1 | 0.65 | 0 |
|  |  |  | HQ | 0.65 | 0.6 | 0.45 | 0.05 |
|  |  |  | NADH | 1.2 | 1.1 | 0.7 | 0.15 |
| 14A | D2 | Glucose | None | 1.1 | 0.2 | 0.7 | 0 |
|  |  |  | HQ | 0.65 | 0.6 | 0.55 | 0.1 |
|  |  |  | NADH | 1.15 | 1.1 | 0.9 | 0.1 |
|  |  | None | None | 1.0 | 0.1 | 0 | 0 |
|  |  |  | HQ | 0.7 | 0.65 | 0 | 0 |
|  |  |  | NADH | 1.2 | 1.1 | 0 | 0 |
| 15A | D3 | Glucose | None | 0.9 | 0.1 | 0.45 | 0 |
|  |  |  | HQ | 0.7 | 0.55 | 0.35 | 0.1 |
|  |  |  | NADH | 1.2 | 1.15 | 0.65 | 0.1 |
|  |  | Fructose | None | 1.0 | 0.2 | 0.5 | 0 |
|  |  |  | HQ | 0.65 | 0.5 | 0.45 | 0.05 |
|  |  |  | NADH | 1.15 | 1.1 | 0.6 | 0.1 |
| 16A | D4 | None | None | 0.9 | 0.05 | 0 | 0 |
|  |  |  | HQ | 0.65 | 0.55 | 0 | 0 |
|  |  |  | NADH | 1.2 | 1.05 | 0 | 0 |
|  |  | Fructose | None | 1.0 | 0.2 | 0.35 | 0 |
|  |  |  | HQ | 0.7 | 0.65 | 0.4 | 0.1 |
|  |  |  | NADH | 1.2 | 1.0 | 0.6 | 0.15 |
| 17A | D5 | Glucose | None | 1.1 | 0.25 | 0.5 | 0 |
|  |  |  | HQ | 0.7 | 0.65 | 0.55 | 0.05 |
|  |  |  | NADH | 1.2 | 1.1 | 0.8 | 0.2 |
|  |  | Fructose | None | 1.0 | 0.1 | 0.6 | 0 |
|  |  |  | HQ | 0.65 | 0.6 | 0.5 | 0.1 |
|  |  |  | NADH | 1.15 | 1.1 | 0.85 | 0.2 |
| 18A | D6 | Glucose | None | 0.7 | 0.2 | 0.45 | 0 |
|  |  |  | HQ | 0.65 | 0.6 | 0.5 | 0.2 |
|  |  |  | NADH | 1.2 | 1.15 | 0.85 | 0.2 |
|  |  | Fructose | None | 0.7 | 0.2 | 0.5 | 0 |
|  |  |  | HQ | 0.65 | 0.6 | 0.55 | 0.1 |
|  |  |  | NADH | 1.15 | 1.1 | 0.8 | 0.1 |

From the results at TABLE 3, it is clear that irradiation of light allows a high discharge voltage to be maintained for all test electrodes used in the cells, and that these cells permit efficient generation of electricity.

Upon using liquid chromatography to analyze the electrolyte containing carbohydrate following testing, gluconic acid, oxalic acid, and formic acid-these being products of oxidation of glucose or fructose-were detected.

Subsequently, the monosaccharides galactose, mannose, and sorbose; the disaccharides maltose, sucrose, lactose, and raffinose; and the polysaccharide starch were used in place of glucose and fructose, and test electrodes 13A through 18A were evaluated in the same fashion as described above. As a result, oxidation of carbohydrate was observed to occur as had been the case with glucose and fructose.

Upon carrying out similar evaluation with a $SnO_2$—ZnO microgranule film in place of the $SnO_2$ microgranule film, more or less similar cell characteristics were obtained. Here, the $SnO_2$—ZnO microgranule film was formed by using the doctor blade method to apply over the ITO thin film a dispersion comprising 95 parts by weight of an ethanol solution containing 15 wt % of polyvinyl alcohol and 5 parts by weight of a mixture of SnO2 granules of average grain diameter 15 nm and ZnO granules of average grain diameter 240 nm in a 5:1 ratio by weight, drying at 80° C., and firing in air at 380° C. for 1 hr. The $SnO_2$—ZnO microgranule film so obtained was approximately 16 μm in thickness.

WORKING EXAMPLE 4

Test electrodes 1A, 6A, 7A, 12A, 13A, and 18A prepared at Working Examples 1 through 3 were respectively used, and a methoxyacetonitrile solution containing 50 mM of glucose or fructose serving as carbohydrate and 0.5 M of lithium iodide, 0.5 M of imidazolium iodide, and 5 mM of 4-tert-butylpyridine was used as the electrolyte containing carbohydrate, to assemble cells similar to those at Working Example 1, the characteristics of which were evaluated. Results are shown at TABLE 4.

Note however that the positive electrode was such that a film coating comprising $MnO_2$ granules formed on an aluminum substrate was used in place of the air electrode and oxygen permeable membrane. This positive electrode was obtained by using the doctor blade method to apply over an aluminum substrate of thickness 0.3 mm a slurry comprising 30 parts by weight of $MnO_2$ granules, 5 parts by weight of acetylene black, 10 parts by weight of graphite, 5 parts by weight of polyvinylidene fluoride, and 50 parts by weight of N-methyl-2-pyrrolidone, and thereafter drying at 150° C. and carrying out roll pressing to mold this so as to obtain a sheet of thickness 0.5 mm.

Moreover, cell discharge was at 100 μA for 20 min for the cells employing test electrodes 1A, 6A, 13A, and 18A, and was at 10 μA for 200 min for the cells employing test electrodes 7A and 12A.

TABLE 4

| Test Electrode | Colorant | Carbohydrate | Redox Pair | OCV (V) Irradiation with light Yes | OCV (V) Irradiation with light No | Cell Voltage following Discharge (V) Irradiation with light Yes | Cell Voltage following Discharge (V) Irradiation with light No |
|---|---|---|---|---|---|---|---|
| 1A | D1 | Glucose | None | 1.4 | 0.6 | 1.1 | 0 |
|  |  | Fructose | None | 1.4 | 0.55 | 1.0 | 0 |
| 6A | D6 | Glucose | None | 1.0 | 0.4 | 0.8 | 0 |
|  |  | Fructose | None | 0.9 | 0.4 | 0.75 | 0 |
| 7A | D1 | Glucose | None | 1.55 | 0.65 | 1.3 | 0 |
|  |  | Fructose | None | 1.6 | 0.7 | 1.3 | 0 |
| 12A | D6 | Glucose | None | 1.1 | 0.4 | 0.9 | 0 |
|  |  | Fructose | None | 1.05 | 0.4 | 0.75 | 0 |
| 13A | D1 | Glucose | None | 1.5 | 0.5 | 1.1 | 0 |
|  |  | Fructose | None | 1.45 | 0.5 | 0.9 | 0 |
| 18A | D6 | Glucose | None | 0.9 | 0.3 | 0.75 | 0 |
|  |  | Fructose | None | 0.95 | 0.35 | 0.7 | 0 |

From the results at TABLE 4, it is clear that irradiation of light allows a high discharge voltage to be maintained for all test electrodes used in the cells, and that these cells permit efficient generation of electricity.

Upon using liquid chromatography to analyze the electrolyte containing carbohydrate following testing, gluconic acid, oxalic acid, and formic acid-these being products of oxidation of glucose or fructose-were detected.

Subsequently, the monosaccharides galactose, mannose, and sorbose; the disaccharides maltose, sucrose, lactose, and raffinose; and the polysaccharide starch were used in place of glucose and fructose, and the foregoing test electrodes were evaluated in the same fashion as described above. As a result, oxidation of carbohydrate was observed to occur as had been the case with glucose and fructose.

In addition, a mixture serving as the electrolyte containing carbohydrate and comprising 12 parts by weight of polyacrylonitrile and 88 parts by weight of a methoxyacetonitrile solution containing 50 mM of glucose or fructose serving as carbohydrate and 0.5 M of lithium iodide, 0.5 M of imidazolium iodide, and 5 mM of 4-tert-butylpyridine was injected into the foregoing cells. The cells were then cooled to −20° C., causing gelation of the mixture. Upon thereafter evaluating the cells after they had been returned to room temperature, characteristics were obtained which were more or less equivalent to the results shown at TABLE 4.

WORKING EXAMPLE 5

(i) Test Electrode Preparation

An indium tin oxide (ITO) thin film of surface resistance 10 ohms/cm$^2$ was formed on a glass substrate of thickness 1 mm.

An acetonitrile solution containing 30 wt % of polyethylene glycol was prepared. 1 part by weight of Ag microgranules of average grain diameter 5 nm and 11 parts by weight of TiO$_2$ microgranules of average grain diameter 10 nm were suspended in 88 parts by weight of this acetonitrile solution.

The glass plate having the ITO thin film was immersed in the dispersion so obtained, and this was dried at 80° C. and fired for 1 hr in argon gas at 400° C. As a result, a TiO$_2$ microgranule film which retained Ag in a carried fashion (hereinafter referred to as "Ag—TiO$_2$ film") and which was approximately 10 μm in thickness was formed over the ITO thin film.

Two glass substrates having the ITO thin film and Ag—TiO$_2$ film were arranged such that the respective Ag—TiO$_2$ films faced one another, and a partitioning frame member comprising sealant material was interposed between the Ag—TiO$_2$ films. The assembly was moreover thoroughly secured such that the partitioning member was sandwiched between the two substrates, constituting a cell.

An ethanol solution containing colorant D1 in a concentration 10 mM was injected into the cell, filling the interior of the cell with the ethanol solution, and this was allowed to stand. One hour thereafter the ethanol solution was discharged from the cell and dry warm air was allowed to pass through the cell interior continuously for 1 hr, resulting in deposition of colorant D1 on the Ag—TiO$_2$ films. The interior of the cell was then filled with 4-tert-butylpyridine, and this was discharged therefrom. Next, the interior of the cell was washed with acetonitrile, and the cell interior was dried with warm air. The cell was thereafter disassembled to obtain test electrode(s) 1B having colorant D1 deposited on the Ag—TiO$_2$ film.

Test electrodes 2B through 6B were obtained in similar fashion as test electrode 1B using D2 through D6 in place of colorant D1.

(ii) Cell Assembly

Cells as shown at FIG. 2 were assembled in the same fashion as at Working Example 1 except for the fact that test electrodes 1B through 6B so obtained were respectively used as negative electrodes.

An electrolyte containing carbohydrate was introduced into the cells. Glucose or fructose was used as carbohydrate. Furthermore, a 0.1 M aqueous solution of KOH was used as the electrolyte. Concentration of glucose or fructose in the electrolyte was 50 mM.

An electrolyte containing glucose or fructose but not containing a redox pair was prepared, and an electrolyte containing glucose or fructose and also containing a redox pair in a concentration 5 mM was prepared. Hydroquinone (HQ) or NADH was used as the redox pair.

(iii) Cell Characteristics

After filling the interior of the cell with the electrolyte containing carbohydrate, evaluation was carried out in the same fashion as at Working Example 1. Results are shown at TABLE 5.

TABLE 5

| Test Electrode | Colorant | Carbohydrate | Redox Pair | OCV (V) Irradiation with light Yes | OCV (V) Irradiation with light No | Cell Voltage following Discharge (V) Irradiation with light Yes | Cell Voltage following Discharge (V) Irradiation with light No |
|---|---|---|---|---|---|---|---|
| 1B | D1 | Glucose | None | 1.2 | 0.35 | 0.95 | 0.2 |
| | | | HQ | 0.8 | 0.7 | 0.75 | 0.45 |
| | | | NADH | 1.25 | 1.1 | 1.1 | 0.55 |
| | | Fructose | None | 1.2 | 0.35 | 0.9 | 0.2 |
| | | | HQ | 0.8 | 0.7 | 0.7 | 0.4 |
| | | | NADH | 1.25 | 1.05 | 0.95 | 0.5 |
| 2B | D2 | Glucose | None | 1.15 | 0.3 | 0.9 | 0.2 |
| | | | HQ | 0.75 | 0.65 | 0.75 | 0.45 |
| | | | NADH | 1.2 | 1.05 | 0.95 | 0.55 |
| | | None | None | 1.0 | 0.1 | 0 | 0 |
| | | | HQ | 0.7 | 0.65 | 0 | 0 |
| | | | NADH | 1.2 | 1.1 | 0 | 0 |
| 3B | D3 | Glucose | None | 1.0 | 0.3 | 0.85 | 0.2 |
| | | | HQ | 0.75 | 0.7 | 0.65 | 0.45 |
| | | | NADH | 1.25 | 1.1 | 0.95 | 0.55 |
| | | Fructose | None | 1.1 | 0.35 | 0.95 | 0.2 |
| | | | HQ | 0.75 | 0.7 | 0.7 | 0.45 |
| | | | NADH | 1.2 | 1.15 | 0.95 | 0.55 |
| 4B | D4 | None | None | 1.05 | 0.25 | 0 | 0 |
| | | | HQ | 0.7 | 0.6 | 0 | 0 |
| | | | NADH | 1.2 | 1.0 | 0 | 0 |
| | | Fructose | None | 1.2 | 0.35 | 0.95 | 0.2 |
| | | | HQ | 0.85 | 0.75 | 0.75 | 0.4 |
| | | | NADH | 1.25 | 1.15 | 1.05 | 0.5 |
| 5B | D5 | Glucose | None | 1.15 | 0.35 | 0.7 | 0.2 |
| | | | HQ | 0.8 | 0.7 | 0.65 | 0.35 |
| | | | NADH | 1.2 | 0.95 | 0.9 | 0.5 |
| | | Fructose | None | 1.1 | 0.35 | 0.85 | 0.2 |
| | | | HQ | 0.75 | 0.7 | 0.65 | 0.4 |
| | | | NADH | 1.2 | 1.0 | 0.9 | 0.45 |
| 6B | D6 | Glucose | None | 0.80 | 0.3 | 0.65 | 0.2 |
| | | | HQ | 0.70 | 0.65 | 0.65 | 0.25 |
| | | | NADH | 1.2 | 1.05 | 1.0 | 0.4 |
| | | Fructose | None | 0.8 | 0.3 | 0.7 | 0.2 |
| | | | HQ | 0.65 | 0.7 | 0.65 | 0.3 |
| | | | NADH | 1.15 | 1.1 | 1.05 | 0.35 |

From the results at TABLE 5, it is clear that irradiation of light allows a high discharge voltage to be maintained for all test electrodes used in the cells, and that these cells permit efficient generation of electricity.

Upon using liquid chromatography to analyze the electrolyte containing carbohydrate following testing, gluconic acid, oxalic acid, and formic acid-these being products of oxidation of glucose or fructose-were detected.

Subsequently, the monosaccharides galactose, mannose, and sorbose; the disaccharides maltose, sucrose, lactose, and raffinose; and the polysaccharide starch were used in place of glucose and fructose, and test electrodes 1B through 6B were evaluated in the same fashion as described above. As a result, oxidation of carbohydrate was observed to occur as had been the case with glucose and fructose.

Next, 8 parts by weight of a mixture containing Ag microgranules of average grain diameter 5 nm, TiO$_2$ microgranules of average grain diameter 10 nm, and $WO_3$ microgranules of average grain diameter 12 nm in a 0.6:5:1 ratio by weight were suspended in 92 parts by weight of an acetonitrile solution containing 30 wt % of polyethylene glycol.

A glass plate having an ITO thin film was immersed in the dispersion so obtained, and this was dried at 80° C. and fired for 1 hr in argon gas at 350° C. As a result, a microgranule film comprising $WO_3$ and $TiO_2$ which retained Ag in a carried fashion (hereinafter referred to as "Ag—$TiO_2$—$WO_3$ film") and which was approximately 8 μm in thickness was formed over the ITO thin film.

Electrodes were prepared by respectively depositing colorants D1 through D6 on the Ag—$TiO_2$—$WO_3$ film in accordance with a method similar to that described above, and these were used to carry out evaluation in a fashion similar to that described above. Results indicated that the cells functioned in a fashion more or less similar to that observed with Ag—$TiO_2$ film.

WORKING EXAMPLE 6

1 part by weight of Ag microgranules of average grain diameter 5 nm was suspended in 99 parts by weight of an acetonitrile solution containing 30 wt % of polyethylene glycol.

A glass plate having an ITO thin film was immersed in the dispersion so obtained, and this was dried at 80° C. and fired for 1 hr in argon gas at 400° C. As a result, the Ag microgranules were retained in a carried fashion over the ITO thin film.

Test electrodes 7B through 12B were thereafter prepared in a similar fashion as at Working Example 5 by respectively depositing colorants D1 through D6 on the ITO thin film which retained Ag microgranules in a carried fashion.

Test electrodes 7B through 12B were respectively used to construct cells in a similar fashion as at Working Example 5, and these were evaluated. Results are shown at TABLE 6. Note however that cell discharge was at 10 μA for 200 min.

TABLE 6

| Test Electrode | Colorant | Carbohydrate | Redox Pair | OCV (V) Irradiation with light Yes | OCV (V) Irradiation with light No | Cell Voltage following Discharge (V) Irradiation with light Yes | Cell Voltage following Discharge (V) Irradiation with light No |
|---|---|---|---|---|---|---|---|
| 7B | D1 | Glucose | None | 1.2 | 0.35 | 0.55 | 0.2 |
| | | | HQ | 0.8 | 0.7 | 0.55 | 0.4 |
| | | | NADH | 1.25 | 1.1 | 0.7 | 0.55 |
| | | Fructose | None | 1.2 | 0.35 | 0.5 | 0.2 |
| | | | HQ | 0.8 | 0.7 | 0.55 | 0.35 |
| | | | NADH | 1.25 | 1.05 | 0.7 | 0.5 |
| 8B | D2 | Glucose | None | 1.15 | 0.3 | 0.6 | 0.2 |
| | | | HQ | 0.75 | 0.65 | 0.55 | 0.35 |
| | | | NADH | 1.2 | 1.05 | 0.65 | 0.45 |
| | | None | None | 1.0 | 0.1 | 0 | 0 |
| | | | HQ | 0.7 | 0.65 | 0 | 0 |
| | | | NADH | 1.2 | 1.1 | 0 | 0 |
| 9B | D3 | Glucose | None | 1.0 | 0.3 | 0.45 | 0.2 |
| | | | HQ | 0.75 | 0.7 | 0.55 | 0.35 |
| | | | NADH | 1.25 | 1.1 | 0.7 | 0.45 |
| | | Fructose | None | 1.1 | 0.35 | 0.35 | 0.2 |
| | | | HQ | 0.75 | 0.7 | 0.5 | 0.35 |
| | | | NADH | 1.2 | 1.15 | 0.6 | 0.45 |
| 10B | D4 | None | None | 1.05 | 0.25 | 0 | 0 |
| | | | HQ | 0.7 | 0.6 | 0 | 0 |
| | | | NADH | 1.2 | 1.0 | 0 | 0 |
| | | Fructose | None | 1.2 | 0.35 | 0.45 | 0.2 |
| | | | HQ | 0.85 | 0.75 | 0.55 | 0.35 |
| | | | NADH | 1.25 | 1.15 | 0.6 | 0.45 |

TABLE 6-continued

| Test Electrode | Colorant | Carbohydrate | Redox Pair | OCV (V) Irradiation with light Yes | OCV (V) Irradiation with light No | Cell Voltage following Discharge (V) Irradiation with light Yes | Cell Voltage following Discharge (V) Irradiation with light No |
|---|---|---|---|---|---|---|---|
| 11B | D5 | Glucose | None | 1.15 | 0.35 | 0.35 | 0.2 |
| | | | HQ | 0.8 | 0.7 | 0.45 | 0.35 |
| | | | NADH | 1.2 | 0.95 | 0.55 | 0.45 |
| | | Fructose | None | 1.1 | 0.35 | 0.4 | 0.2 |
| | | | HQ | 0.75 | 0.7 | 0.55 | 0.35 |
| | | | NADH | 1.2 | 1.0 | 0.6 | 0.4 |
| 12B | D6 | Glucose | None | 0.8 | 0.3 | 0.35 | 0.2 |
| | | | HQ | 0.7 | 0.65 | 0.4 | 0.25 |
| | | | NADH | 1.2 | 1.05 | 0.45 | 0.35 |
| | | Fructose | None | 0.8 | 0.3 | 0.35 | 0.2 |
| | | | HQ | 0.65 | 0.7 | 0.45 | 0.3 |
| | | | NADH | 1.15 | 1.1 | 0.45 | 0.35 |

From the results at TABLE 6, it is clear that irradiation of light allows a high discharge voltage to be maintained for all test electrodes used in the cells, and that these cells permit efficient generation of electricity.

Upon using liquid chromatography to analyze the electrolyte containing carbohydrate following testing, gluconic acid, oxalic acid, and formic acid-these being products of oxidation of glucose or fructose-were detected.

Subsequently, the monosaccharides galactose, mannose, and sorbose; the disaccharides maltose, sucrose, lactose, and raffinose; and the polysaccharide starch were used in place of glucose and fructose, and test electrodes 7B through 12B were evaluated in the same fashion as described above. As a result, oxidation of carbohydrate was observed to occur as had been the case with glucose and fructose.

WORKING EXAMPLE 7

An ethanol solution containing 15 wt % of polyvinyl alcohol was prepared. 1 part by weight of Pt microgranules of average grain diameter 5 nm and 11 parts by weight of $SnO_2$ microgranules of average grain diameter 15 nm were suspended in 88 parts by weight of this ethanol solution.

The spin coating method was used to apply the dispersion so obtained to an ITO substrate having an ITO thin film, and this was dried at 80° C. and fired for 1 hr in air at 380° C. As a result, an $SnO_2$ microgranule film which retained Pt in a carried fashion (hereinafter referred to as "Pt—$SnO_2$ film") and which was approximately 15 μm in thickness was formed over the ITO thin film.

Test electrodes 13B through 18B were prepared by respectively depositing colorants D1 through D6 on the Pt—$SnO_2$ film. Furthermore, test electrodes 13B through 18B were respectively used to construct cells in a similar fashion as at Working Example 5, and these were evaluated. Note however that cell discharge was at 100 μA for 20 min. results are shown at TABLE 7.

TABLE 7

| Test Electrode | Colorant | Carbohydrate | Redox Pair | OCV (V) Irradiation with light Yes | OCV (V) Irradiation with light No | Cell Voltage following Discharge (V) Irradiation with light Yes | Cell Voltage following Discharge (V) Irradiation with light No |
|---|---|---|---|---|---|---|---|
| 13B | D1 | Glucose | None | 1.25 | 0.55 | 0.95 | 0.5 |
| | | | HQ | 0.8 | 0.75 | 0.75 | 0.55 |

TABLE 7-continued

| Test Electrode | Colorant | Carbohydrate | Redox Pair | OCV (V) Irradiation with light Yes | OCV (V) Irradiation with light No | Cell Voltage following Discharge (V) Irradiation with light Yes | Cell Voltage following Discharge (V) Irradiation with light No |
|---|---|---|---|---|---|---|---|
| | | | NADH | 1.25 | 1.05 | 1.2 | 0.6 |
| | | Fructose | None | 1.25 | 0.5 | 0.95 | 0.5 |
| | | | HQ | 0.8 | 0.7 | 0.7 | 0.5 |
| | | | NADH | 1.2 | 1.05 | 1.15 | 0.6 |
| 14B | D2 | Glucose | None | 1.15 | 0.5 | 0.9 | 0.45 |
| | | | HQ | 0.75 | 0.65 | 0.75 | 0.5 |
| | | | NADH | 1.15 | 1.0 | 0.9 | 0.5 |
| | | None | None | 1.0 | 0.45 | 0 | 0 |
| | | | HQ | 0.7 | 0.65 | 0 | 0 |
| | | | NADH | 1.1 | 1.0 | 0 | 0 |
| 15B | D3 | Glucose | None | 1.1 | 0.45 | 0.9 | 0.45 |
| | | | HQ | 0.75 | 0.55 | 0.65 | 0.45 |
| | | | NADH | 1.25 | 0.9 | 0.9 | 0.5 |
| | | Fructose | None | 1.05 | 0.45 | 0.85 | 0.5 |
| | | | HQ | 0.75 | 0.55 | 0.65 | 0.55 |
| | | | NADH | 1.2 | 0.95 | 0.7 | 0.55 |
| 16B | D4 | None | None | 1.1 | 0.45 | 0 | 0 |
| | | | HQ | 0.8 | 0.65 | 0 | 0 |
| | | | NADH | 1.2 | 0.95 | 0 | 0 |
| | | Fructose | None | 1.1 | 0.5 | 1.0 | 0.5 |
| | | | HQ | 0.75 | 0.6 | 0.65 | 0.55 |
| | | | NADH | 1.25 | 1.0 | 1.05 | 0.6 |
| 17B | D5 | Glucose | None | 1.1 | 0.4 | 0.85 | 0.5 |
| | | | HQ | 0.7 | 0.65 | 0.65 | 0.55 |
| | | | NADH | 1.15 | 1.05 | 0.95 | 0.55 |
| | | Fructose | None | 1.1 | 0.5 | 0.75 | 0.55 |
| | | | HQ | 0.65 | 0.6 | 0.7 | 0.6 |
| | | | NADH | 1.15 | 1.1 | 0.95 | 0.65 |
| 18B | D6 | Glucose | None | 0.8 | 0.45 | 0.9 | 0.5 |
| | | | HQ | 0.65 | 0.6 | 0.65 | 0.5 |
| | | | NADH | 1.2 | 1.1 | 1.05 | 0.6 |
| | | Fructose | None | 0.8 | 0.45 | 0.85 | 0.45 |
| | | | HQ | 0.65 | 0.6 | 0.8 | 0.5 |
| | | | NADH | 1.15 | 1.05 | 0.95 | 0.55 |

From the results at TABLE 7, it is clear that irradiation of light allows a high discharge voltage to be maintained for all test electrodes used in the cells, and that these cells permit efficient generation of electricity.

Upon using liquid chromatography to analyze the electrolyte containing carbohydrate following testing, gluconic acid, oxalic acid, and formic acid-these being products of oxidation of glucose or fructose-were detected.

Subsequently, the monosaccharides galactose, mannose, and sorbose; the disaccharides maltose, sucrose, lactose, and raffinose; and the polysaccharide starch were used in place of glucose and fructose, and test electrodes 13B through 18B were evaluated in the same fashion as described above. As a result, oxidation of carbohydrate was observed to occur as had been the case with glucose and fructose.

Next, 5 parts by weight of a mixture containing Pt microgranules of average grain diameter 5 nm, $SnO_2$ microgranules of average grain diameter 15 nm, and ZnO microgranules of average grain diameter 240 nm in a 0.5:5:1 ratio by weight were suspended in 95 parts by weight of an ethanol solution containing 15 wt % of polyvinyl alcohol.

The doctor blade method was used to apply the dispersion so obtained over the ITO thin film of a glass plate having an ITO thin film, and this was dried at 80° C. and fired for 1 hr in air at 380° C. As a result, a microgranule film comprising ZnO and $SnO_2$ which retained Pt in a carried fashion (hereinafter referred to as "Pt—$SnO_2$—ZnO film") and which was approximately 16 μm in thickness was formed over the ITO thin film.

Electrodes were prepared by respectively depositing colorants D1 through D6 on the Pt—$SnO_2$—ZnO film in accordance with a method similar to that described above, and cells were constructed and evaluated. Results indicated that the cells functioned in a fashion more or less similar to that observed with Pt—$SnO_2$ film.

WORKING EXAMPLE 8

1 part by weight of Cu microgranules of average grain diameter 10 nm and 11 parts by weight of $TiO_2$ microgranules of average grain diameter 20 nm were suspended in 88 parts by weight of an ethanol solution containing 15 wt % of polyvinyl alcohol.

The spin coating method was used to apply the dispersion so obtained over the ITO thin film of a glass substrate having an ITO thin film, and this was dried at 80° C. and fired for 1 hr in air at 300° C. As a result, a $TiO_2$ microgranule film which retained Cu in a carried fashion (hereinafter referred to as "Cu—$TiO_2$ film") and which was approximately 20 μm in thickness was formed over the ITO thin film.

Test electrodes 19B through 24B were prepared by respectively depositing colorants D1 through D6 on the Cu—$TiO_2$ film. Furthermore, test electrodes 19B through 24B were respectively used to construct cells in a similar fashion as at Working Example 5, and these were evaluated. Note however that cell discharge was at 100 μA for 20 min. Results are shown at TABLE 8.

TABLE 8

| Test Electrode | Colorant | Carbohydrate | Redox Pair | OCV (V) Irradiation with light Yes | OCV (V) Irradiation with light No | Cell Voltage following Discharge (V) Irradiation with light Yes | Cell Voltage following Discharge (V) Irradiation with light No |
|---|---|---|---|---|---|---|---|
| 19B | D1 | Glucose | None | 1.2 | 0.35 | 0.95 | 0.4 |
| | | | HQ | 0.8 | 0.7 | 0.75 | 0.5 |
| | | | NADH | 1.25 | 1.1 | 1.1 | 0.55 |
| | | Fructose | None | 1.2 | 0.35 | 0.9 | 0.35 |
| | | | HQ | 0.8 | 0.7 | 0.7 | 0.45 |
| | | | NADH | 1.25 | 1.05 | 0.95 | 0.55 |
| 20B | D2 | Glucose | None | 1.15 | 0.3 | 0.9 | 0.35 |
| | | | HQ | 0.75 | 0.65 | 0.75 | 0.45 |
| | | | NADH | 1.2 | 1.05 | 0.95 | 0.5 |
| | | None | None | 1.0 | 0.1 | 0 | 0 |
| | | | HQ | 0.7 | 0.65 | 0 | 0 |
| | | | NADH | 1.2 | 1.1 | 0 | 0 |
| 21B | D3 | Glucose | None | 1.0 | 0.3 | 0.85 | 0.4 |
| | | | HQ | 0.75 | 0.7 | 0.65 | 0.45 |
| | | | NADH | 1.25 | 1.1 | 0.95 | 0.55 |
| | | Fructose | None | 1.1 | 0.35 | 0.95 | 0.45 |
| | | | HQ | 0.75 | 0.7 | 0.7 | 0.45 |
| | | | NADH | 1.2 | 1.15 | 0.95 | 0.5 |
| 22B | D4 | None | None | 1.05 | 0.25 | 0 | 0 |
| | | | HQ | 0.7 | 0.6 | 0 | 0 |
| | | | NADH | 1.2 | 1.0 | 0 | 0 |
| | | Fructose | None | 1.2 | 0.35 | 0.95 | 0.4 |
| | | | HQ | 0.85 | 0.75 | 0.75 | 0.45 |
| | | | NADH | 1.25 | 1.15 | 1.05 | 0.55 |
| 23B | D5 | Glucose | None | 1.15 | 0.35 | 0.7 | 0.35 |
| | | | HQ | 0.8 | 0.7 | 0.65 | 0.45 |
| | | | NADH | 1.2 | 0.95 | 0.9 | 0.55 |
| | | Fructose | None | 1.1 | 0.35 | 0.85 | 0.35 |
| | | | HQ | 0.75 | 0.7 | 0.65 | 0.45 |
| | | | NADH | 1.2 | 1.0 | 0.9 | 0.5 |
| 24B | D6 | Glucose | None | 0.8 | 0.3 | 0.65 | 0.4 |
| | | | HQ | 0.7 | 0.65 | 0.65 | 0.35 |
| | | | NADH | 1.2 | 1.05 | 1.0 | 0.5 |
| | | Fructose | None | 0.8 | 0.3 | 0.7 | 0.35 |
| | | | HQ | 0.65 | 0.7 | 0.65 | 0.4 |
| | | | NADH | 1.15 | 1.1 | 1.05 | 0.45 |

From the results at TABLE 8, it is clear that irradiation of light allows a high discharge voltage to be maintained for all test electrodes used in the cells, and that these cells permit efficient generation of electricity.

Upon using liquid chromatography to analyze the electrolyte containing carbohydrate following testing, gluconic acid, oxalic acid, and formic acid-these being products of oxidation of glucose or fructose-were detected.

Subsequently, the monosaccharides galactose, mannose, and sorbose; the disaccharides maltose, sucrose, lactose, and raffinose; and the polysaccharide starch were used in place of glucose and fructose, and test electrodes 19B through 24B were evaluated in the same fashion as described above. As a result, oxidation of carbohydrate was observed to occur as had been the case with glucose and fructose.

Next, 5 parts by weight of a mixture containing Cu microgranules of average grain diameter 10 nm, $TiO_2$ microgranules of average grain diameter 20 nm, and ZnO microgranules of average grain diameter 240 nm in a 0.5:5:1 ratio by weight were suspended in 95 parts by weight of an ethanol solution containing 15 wt % of polyvinyl alcohol.

The doctor blade method was used to apply the dispersion so obtained over the ITO thin film of a glass substrate having an ITO thin film, and this was dried at 80° C. and fired for 1 hr in air at 300° C. As a result, a microgranule film comprising ZnO and $TiO_2$ which retained Cu in a carried fashion (hereinafter referred to as "Cu—$TiO_2$—ZnO film") and which was approximately 20 μm in thickness was formed over the ITO thin film.

Electrodes were prepared by respectively depositing colorants D1 through D6 on the Cu—$TiO_2$—ZnO film in accordance with a method similar to that described above, and cells were constructed and evaluated. Results indicated that the cells functioned in a fashion more or less similar to that observed with Cu—$TiO_2$ film.

WORKING EXAMPLE 9

A methoxyacetonitrile solution containing 50 mM of glucose or fructose serving as carbohydrate and 0.5 M of lithium iodide, 0.5 M of imidazolium iodide, and 5 mM of 4-tert-butylpyridine was prepared for use as the electrolyte containing carbohydrate.

The positive electrode was such that an $MnO_2$ microgranule film formed on an aluminum substrate which was identical to that used at Working Example 4 was used in place of the air electrode having an oxygen permeable membrane.

Test electrodes 1B, 6B, 7B, 12B, 13B, 18B, 19B, and 24B prepared at Working Examples 5 through 8 were respectively used as negative electrodes.

The foregoing electrolyte, positive electrode, and prescribed negative electrodes were used to assemble cells similar to that of Working Example 5, and the characteristics of those cells were evaluated. Note however that cell discharge was at 100 μA for 20 min for the cells employing test electrodes 1B, 6B, 13B, 18B, 19B, and 24B, and was at 10 μA for 200 min for the cells employing test electrodes 7B and 12B. Results are shown at TABLE 9.

TABLE 9

| Test Electrode | Colorant | Carbohydrate | Redox Pair | OCV (V) Irradiation with light Yes | OCV (V) Irradiation with light No | Cell Voltage following Discharge (V) Irradiation with light Yes | Cell Voltage following Discharge (V) Irradiation with light No |
|---|---|---|---|---|---|---|---|
| 1B | D1 | Glucose | None | 1.4 | 0.6 | 1.1 | 0.2 |
|  |  | Fructose | None | 1.4 | 0.55 | 1.0 | 0.15 |
| 6B | D6 | Glucose | None | 1.0 | 0.4 | 0.8 | 0.15 |
|  |  | Fructose | None | 0.9 | 0.4 | 0.75 | 0.15 |
| 7B | D1 | Glucose | None | 1.55 | 0.65 | 1.3 | 0.15 |
|  |  | Fructose | None | 1.6 | 0.7 | 1.3 | 0.1 |
| 12B | D6 | Glucose | None | 1.1 | 0.4 | 0.9 | 0.2 |
|  |  | Fructose | None | 1.05 | 0.4 | 0.75 | 0.15 |
| 13B | D1 | Glucose | None | 1.5 | 0.5 | 1.1 | 0.35 |
|  |  | Fructose | None | 1.45 | 0.5 | 0.9 | 0.3 |
| 18B | D6 | Glucose | None | 0.9 | 0.3 | 0.75 | 0.3 |
|  |  | Fructose | None | 0.95 | 0.35 | 0.7 | 0.3 |
| 19B | D1 | Glucose | None | 1.4 | 0.5 | 1.2 | 0.25 |
|  |  | Fructose | None | 1.4 | 0.5 | 1.15 | 0.2 |
| 24B | D6 | Glucose | None | 1.1 | 0.45 | 1.1 | 0.25 |
|  |  | Fructose | None | 1.0 | 0.45 | 1.05 | 0.25 |

From the results at TABLE 9, it is clear that irradiation of light allows a high discharge voltage to be maintained for all test electrodes used in the cells, and that these cells permit efficient generation of electricity.

Upon using liquid chromatography to analyze the electrolyte containing carbohydrate following testing, gluconic acid, oxalic acid, and formic acid-these being products of oxidation of glucose or fructose-were detected.

Subsequently, the monosaccharides galactose, mannose, and sorbose; the disaccharides maltose, sucrose, lactose, and raffinose; and the polysaccharide starch were used in place of glucose and fructose, and test electrodes 19B through 24B were evaluated in the same fashion as described above. As a result, oxidation of carbohydrate was observed to occur as had been the case with glucose and fructose.

Next, 12 parts by weight of polyacrylonitrile was mixed with 88 parts by weight of the foregoing electrolyte, and the mixture so obtained was injected into the cells as an electrolyte. Moreover, the cells were cooled to −20° C., causing gelation of the mixture. The temperature of the cells was thereafter returned to room temperature, and the characteristics of the cells were evaluated. As a result, characteristics were obtained which were more or less equivalent to the results shown at TABLE 8.

Industrial Applicability

Because it utilizes a molecule capable of being excited due to absorption of light and electrochemically oxidizing carbohydrate, the present invention makes it possible for the chemical energy which carbohydrates possess to be effectively utilized directly as electrical energy.

What is claimed is:

1. A method for generating electricity employing a positive electrode, a negative electrode, and an electrolyte intervening between said positive electrode and said negative electrode, said electrolyte containing a carbohydrate, wherein a molecule capable of being excited due to absorption of light and electrochemically oxidizing and decomposing said carbohydrate, a conductor and an oxide semiconductor are provided at said negative electrode;

said oxide semiconductor is formed on the surface of said conductor, said molecule attached to the surface of said oxide semiconductor, said molecule comprising a metal complex colorant, an organic colorant or a porphyrinic colorant, said metal complex colorant being a ruthenium complex colorant having Ru as a central atom and having a biquinoline group, a bipyridyl group, a phenanthroline group, a thiocyanate group or a derivative of any of these groups as a ligand, or, a ruthenium complex colorant having Pt as a central atom and having a biquinoline group, a bipyridyl group, a phenanthroline group, a thiocyanate group or a derivative of any of these groups as a ligand, said organic colorant being a 9-phenylxanthenic colorant, a merocyaninic colorant or a polymethinic colorant;

with production of electromotive force occurring between said positive electrode and said negative electrode as a result of supply of carbohydrate while said molecule is irradiated with light and oxidization and decomposition of said carbohydrate by said molecule at said negative electrode.

2. The method for generating electricity in accordance with claim 1, wherein a metal element capable of forming a complex comprising a carbohydrate hydroxyl group serving as a ligand is provided at said oxide semiconductor, and carbohydrate forming said complex is oxidized and decomposed by said molecule.

3. The method for generating electricity in accordance with claim 1, wherein said molecule is excited as a result of absorption of light having wavelength within the range of from 300 nm to 1000 nm.

4. The method for generating electricity in accordance with claim 1, wherein reduction of oxygen takes place at said positive electrode.

5. The method for generating electricity in accordance with claim 2 wherein said metal element is at least one species selected from among the group consisting of Cu, Ag, and Pt.

6. A battery comprising a positive electrode, a negative electrode, and an electrolyte intervening between said positive electrode and said negative electrode, said electrolyte containing a carbohydrate, wherein said negative electrode has a molecule capable of being excited due to absorption of light and electrochemically oxidizing and decomposing said carbohydrate, a conductor and an oxide semiconductor, said oxide semiconductor is formed on the surface of said conductor, said molecule is attached to the surface of said oxide semiconductor, said molecule comprising a metal complex colorant, organic colorant or a porphyrinic colorant, said metal complex colorant being a ruthenium complex colorant having Ru as a central atom and having a biquinoline group, a bipyridyl group, a phenanthroline group, a thiocyanate group or a derivative of any of these groups as a ligand, or, a ruthenium complex colorant having Pt as a central atom and having a biquinoline group, a bipyridyl group, a phenanthroline group, a thiocyanate group or a derivative of any of these groups as a ligand, said organic colorant being a 9-phenylxanthenic colorant, a merocyaninic colorant or a polymethinic colorant;

with production of electromotive force occurring between said positive electrode and said negative electrode as a result of supply of carbohydrate while said molecule is irradiated with light and oxidization and decomposition of said carbohydrate by said molecule at said negative electrode.

7. The battery in accordance with claim 6, wherein said oxide semiconductor has a metal element capable of forming a complex comprising a carbohydrate hydroxyl group serving as a ligand.

8. The battery in accordance with claim 6, wherein said positive electrode is an oxygen electrode which reduces oxygen.

9. The method for generating electricity in accordance with claim 1, wherein electrons generated when said carbohydrate is oxidized and decomposed are accepted by said oxide semiconductor, and said electrons are supplied to an external electric circuit through said conductor.

10. The method for generating electricity in accordance with claim 1, wherein said electrolyte contains a redox pair, and said molecule electrochemically oxidizes and decomposes said carbohydrate by said redox pair.

11. The method for generating electricity in accordance with claim 10, wherein said redox pair is a quinone-hydroquinone pair.

12. The method for generating electricity in accordance with claim 10, wherein said redox pair is a NAD—NADH pair.

13. The method for generating electricity in accordance with claim 10, wherein oxalic acid is produced when said carbohydrate is electrochemically oxidized and decomposed.

14. The method for generating electricity in accordance with claim 10, wherein formic acid is produced when said carbohydrate is electrochemically oxidized and decomposed.

15. The battery in accordance with claim 6, wherein said molecule is excited as a result of absorption of light having wavelength within the range of from 300 to 1000 nm.

16. The battery in accordance with claim 7, wherein said metal element is at least one selected from the group consisting of Cu, Ag and Pt.

17. The battery in accordance with claim 6, wherein electrons generated when said carbohydrate is oxidized and decomposed are accepted by said oxide semiconductor, and said electrons are supplied to an external electric circuit through said conductor.

18. The battery in accordance with claim 6, wherein said electrolyte contains a redox pair, and said molecule electrochemically oxidizes and decomposes said carbohydrate by said redox pair.

19. The battery in accordance with claim 18, wherein said redox pair is a quinone-hydroquinone pair.

20. The battery in accordance with claim 18, wherein said redox pair is a NAD—NADH pair.

21. The battery in accordance with claim 6, wherein oxalic acid is produced when said carbohydrate is electrochemically oxidized and decomposed.

22. The battery in accordance with claim 6, wherein formic acid is produced when said carbohydrate is electrochemically oxidized and decomposed.

23. The method for generating electricity in accordance with claim 1, wherein both said conductor and said oxide semiconductor transmit light.

24. The battery in accordance with claim 6, wherein both said conductor and said oxide semiconductor transmit light.

* * * * *

UNITED STATES PATENT AND TRADEMARK OFFICE
CERTIFICATE OF CORRECTION

PATENT NO. : 6,916,576 B2
DATED : July 12, 2005
INVENTOR(S) : Tadashi Sotomura

It is certified that error appears in the above-identified patent and that said Letters Patent is hereby corrected as shown below:

Title page,
Item [56], References Cited, OTHER PUBLICATIONS,
"K.M. Gangotri, et al," reference, the phrase "Cell for Solar Engery" should read -- Cell for Solar Energy --.
"B. Alberts, et al," reference, the phrase "Obtain Engery" should read -- Obtain Energy --.
"H. Sugihara, et al," reference the phrase "Efficient Photosensitaization" should read -- Efficient Photosensitization --.
Add the following reference:
-- Hamer, et al, 'The Cyanine Dyes and Related Compounds', The Chemistry of Heterocyclic Compounds, 1964 --.

Column 22,
Line 62, after the word "molecule", insert -- is --.

Column 23,
Line 44, before the word "organic", insert -- an --.

Signed and Sealed this

Twenty-ninth Day of November, 2005

JON W. DUDAS
*Director of the United States Patent and Trademark Office*